US012200428B2

(12) United States Patent
Jakobsen et al.

(10) Patent No.: US 12,200,428 B2
(45) Date of Patent: Jan. 14, 2025

(54) STABILIZED FLOATING HEADBAND FOR A HEADSET

(71) Applicant: GN Audio A/S, Ballerup (DK)

(72) Inventors: Kristian Lilhauge Jakobsen, Ballerup (DK); Mads Schenstrøm Stefansen, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 195 days.

(21) Appl. No.: 18/052,355

(22) Filed: Nov. 3, 2022

(65) Prior Publication Data

US 2023/0164476 A1 May 25, 2023

(30) Foreign Application Priority Data

Nov. 19, 2021 (EP) .................................... 21209188

(51) Int. Cl.
*H04R 1/10* (2006.01)

(52) U.S. Cl.
CPC ........... *H04R 1/105* (2013.01); *H04R 1/1008* (2013.01); *H04R 1/1058* (2013.01)

(58) Field of Classification Search
CPC .... H04R 1/105; H04R 1/1008; H04R 1/1058; H04R 5/0335; H04R 1/1091; H04R 1/10; H04R 1/1033
See application file for complete search history.

(56) References Cited

U.S. PATENT DOCUMENTS 5,574,795 A * 11/1996 Seki .................... H04R 5/0335 381/385
5,590,213 A 12/1996 Urella et al.
2016/0212519 A1* 7/2016 Henderson ........... H04R 5/0335
2019/0356976 A1* 11/2019 Mobed ................. H04R 5/0335
2020/0154188 A1 5/2020 Boyer et al.
2020/0280801 A1* 9/2020 Andersen ............ H04R 1/1033

FOREIGN PATENT DOCUMENTS

DE 2649124 A1 6/1977
EP 3119107 B1 11/2019
JP H02205648 A 8/1990
JP 2000032580 A * 1/2000 ............... H04R 1/10

OTHER PUBLICATIONS

The extended European search report issued in European Application No. 21209188.8, dated May 17, 2022.

* cited by examiner

*Primary Examiner* — Angelica M McKinney
(74) *Attorney, Agent, or Firm* — HSML P. C.

(57) ABSTRACT

A headband for a headset comprising a carrier, a first strap and a wrapping is disclosed. The carrier is curved to conform to a wearer's head. The first strap is attached to the carrier at two attachment points. The wrapping is attached to the carrier and arranged to conceal the first strap. The first strap and the wrapping together form a head abutment portion extending between the two attachment points and configured to abut to the wearer's head when the headband is worn by the wearer. At least one of the first strap and the wrapping comprises a flexible and elastic material configured to stretch along the length of the carrier between the two attachment points, thereby providing the head abutment portion configured to adapt to the shape of the wearer's head.

11 Claims, 6 Drawing Sheets a)

b)

STABILIZED FLOATING HEADBAND FOR A HEADSET

FIELD

The present disclosure relates to a headband for a headset comprising a carrier, a first strap, and a wrapping.

BACKGROUND

Headsets may be used in various settings and the users may be wearing the headsets during long time spans. Headset users require a comfortable design, a good fit, as well as good stability of the headset. Also, most of the users desire lightweight and discreet headset. Therefore, it is desired to have a headset which provides a good overall fit with the user's head and at the same time good comfort for the user. All these characteristics are mainly determined by a headband typically worn over the user's head. A number of different headbands are available on the market.

Some of the available headbands have several pieces which allow users to adapt the headband to their own preferences. Having a headband with many separate pieces can be complex to use, movable parts are prone to wear, the user may not be able to achieve an optimal fit, and assembly of such headbands can be complex and thereby expensive.

Some headbands have a suspended soft part separated from a rigid carrier. However, these headbands leave an opening between the carrier and suspension, leaving space for, e.g., hair to get entangled there between and be pulled by the suspension. Also, if such headband is carried in a user's bag, personal belongings may get entangled in the opening. Due to the open construction of such suspended headband, it is difficult to control how high the carrier will be floating above the head of the user. Thereby, the stability of the headband varies from user to user, thus reducing the likelihood of the headset staying in place.

Some headbands have a bulky padding which often adds to the weight of the headband and does not provide as great a comfort as there is a limitation to the extent to which the padding can adapt to a shape of a user's head.

Therefore, there is a need for an improved headband for a headset to overcome problems of the prior art.

SUMMARY

It is an object of embodiments of the present invention to provide a headband which provides a comfortable, secure fit for a range of head sizes and shapes.

It is an object of embodiments of the present invention to provide a headband with improved stability.

It is a further object of embodiments of the present invention to provide a headband which prevents hair from getting entangled in the headband when the headband is worn by a user or prevents a user's belongings from getting stuck in the headband when the headband is carried in a user's bag.

It is a yet further object of embodiments of the present invention to provide a headband which allows for a wide range of solutions to hide and/or protect an electrical cable which may run across the headband.

It is also an object of embodiments of the present invention to provide a headband with a simplified design compared to headbands known in the art.

It is a further object of embodiments of the present invention to provide a headband which is easy to manufacture.

It is a further object of embodiments of the present invention to provide a lightweight headband which thereby provides great comfort to potential users.

In a first aspect, the invention discloses a headband for a headset, the headband being configured to carry at least one earcup of the headset. The headband comprises a carrier, a first strap and a wrapping. The carrier is being curved to conform to a wearer's head. The first strap is attached to the carrier at two attachment points. The wrapping is being attached to the carrier and arranged to conceal the first strap. The first strap and the wrapping together form a head abutment portion extending between the two attachment points and configured to abut to the wearer's head when the headband is worn by the wearer. At least one of the first strap and the wrapping comprises a flexible and elastic material configured to stretch along the length of the carrier between the two attachment points thereby providing the head abutment portion configured to adapt to the shape of the wearer's head.

In the present context, the term "headband" is to be interpreted to refer to a band to be worn over the user's head, and in particular over the top of the user's head while the ends of the headband may abut sides of the user's head, e.g. at the ear(s). In the following, the terms "user" and "wearer" may be used interchangeably about the person having the headset on his/her head.

The headband is suitable for a headset, and in particular for an over-the-head headset. In other words, the headband forms part of a headset. The headset, in addition to the headband, comprises an earcup carried by the headband. The engagement between the headband and the earcup can be established in various ways known in the art. The earcup is typically arranged at one end of the headband. The other end of the headband may comprise a stabilization element abutting a side of the user's head to ensure proper positioning of the headband and headset. The earcup defines an inner surface, typically for engagement against one of or around the ears of the user. The earcup may comprise various electronic elements necessary for a proper functioning of the headset, and in particular a speaker configured to generate a sound signal. Alternatively, the earcup may be a passive mechanical means configured to provide noise attenuation/cancellation. The headset may further comprise a microphone and/or another earcup to be arranged on the other ear of the user. The microphone may be arranged onto an earcup or, alternatively, directly on the headband. The microphone may be arranged on a microphone boom arm.

The headband of the present invention may be used for an audio headset, i.e. a headset used for audio purposes, and/or it may be used for a noise-attenuating headset which provides a passive noise attenuation capability.

The headband comprises a carrier, a first strap and a wrapping. The carrier, first strap, and wrapping may be arranged so as to form an one-piece headband. In other words, the carrier and suspension may form an integral part and cannot be detached from each other in a non-destructive manner, i.e. without damaging the headband.

When producing the headband, at first, the carrier may be provided. The carrier may generally be U-shaped having two ends and may exhibit flexible behaviour to ensure a fit to various head sizes, in particular various head widths of potential users. The carrier may be made of a metal material, a plastic material, or even wood. The carrier may be machined by a machine, rolled, pressed, cast in a mould, or even be hand-made. Regardless of the material selection, the carrier may have a thickness and a width which provide good mechanical stability and flexibility at the same time.

Furthermore, the carrier may be configured to provide a basic clamping force exerted to the head of the user. The basic clamping force is manipulated by controlling the thickness, cross section and deflection of the carrier. The provided carrier may be produced such that it has a very small variance and deviation from a modelled carrier.

The carrier is being curved to generally conform to a wearer's head. The carrier normally defines a central opening and has left and right carrier ends and a central frame region between and elevated relative to the left and right carrier ends. Opposing segments of the carrier may be substantially parallel. A segment of a portion of the headband defining the central opening may have a circular cross-sectional geometry.

The first strap may be a thin band of a bendable material having a width equal to or smaller than the width of the carrier and having a length shorter than the distance between the attachment points along the carrier but longer than a straight line connecting the two attachment points. In the present context, the term strap is to be interpreted as a narrow and relatively flat piece of a flexible material having a width which is at least 3 times smaller than its length. Terms "band" and "strap" may be used interchangeably. When attached to the carrier, the first strap may loosely hang on the carrier and may take any shape. Only when the first band is supported by the wrapping and when the headband is placed on the user's head exerting tension, the first strap will take a shape which follows the shape of the user's head. The first strap may be in contact with the head along a first contact length. As the first strap is bendable, any curvature, e.g. a bump, which may exist on the user's head, will be accommodated.

The wrapping is typically configured to rest at and abut the top of the user's head when the headband is in use, thereby at least partially supporting the weight of the entire headset. The wrapping may contribute to the basic clamping force generated by the carrier to fine tune it, and in particular when the headband is fitted in place on the head. The wrapping, together with the first strap, defines a headband airy padding which provides a secure fit of the headband and further ensures good wearing comfort, especially for long-term wearing comfort due to the flexible material which is soft and elastic and easy to stretch and deform. By a careful selection of the wrapping material used for the wrapping, wearing comfort can be drastically improved.

The wrapping may be made from a flexible material. The wrapping may be elastic. The wrapping may be stretchable. Flexible and/or elastic and/or stretchable materials allow for the wrapping to fold over the first strap and the carrier and adapt to the user's head shape. The wrapping may be made of a fabric material, leatherette, silicone, a soft plastic material, a mesh, such as partly transparent mesh, or any other material which can provide good comfort given that the wrapping gets into direct contact with the user's head. The wrapping may support the first strap placement and may close space formed between the first strap and the carrier. The wrapping may support the first strap placement close to the carrier, thereby contributing to a stability of the headband, in particular forward and backward stability of the headband, restricting forward headband drop and/or backward bending. The wrapping may be wrapped around the entire carrier so that only the wrapping is visible on the final headband. Normally, soft fabrics are selected for the wrapping. Soft fabrics are widely used for various applications. Therefore, manufacturing of the headband is cheap and simple. As the wrapping may be made of a fabric material, when the user stretches the headband to fit it onto the head, the wrapping will adjust automatically to fit the head and to ensure good fit and comfort. The wrapping together with the first strap further allow for a headband which is not bulky, and thereby headset design, appearance, and/or weight are not jeopardized. The wrapping material used for the wrapping may easily be pigmented/colored so that the headband has any color desired by the user.

The first strap is attached to the carrier at two attachment points. The two attachment points can be arranged at a distance, equally spaced from a midpoint of the carrier. The midpoint is normally equidistant from both ends of the U-like shaped carrier. The attachment points may be arranged at a distance of 10-40 cm, such as 15-25 cm, along the carrier from its midpoint. The attachment points may be defined by the user's requirements. By arranging the attachment points symmetrically around the midpoint of the carrier, stability of the headband arranged onto the head of the user can be improved.

The wrapping is being attached to the carrier and arranged to conceal the first strap. Therefore, the first strap will be placed between the wrapping and the carrier, and the wrapping supports the first strap. As the wrapping conceals the first strap, the first strap may not be visible on the final headband, unless the wrapping is made of a transparent material. The wrapping may be attached to the carrier at the attachment points or at any other point along the carrier between the carrier ends and the attachment points. In this way the headband has effects of a suspended headband in which the suspension is concealed, thereby improving comfort and fit and preventing any item (hair, personal belongings) to get entangled between the suspension and the carrier.

The wrapping may be removably attached to the carrier. In this way, a lifetime of the headband can be extended by replacing the wrapping and exchanging with another one with the same properties. Alternatively, the wrapping may be non-removably attached to the carrier, and once the wrapping is attached to the carrier, it may not be easily removable without damaging the headband. In other words, the wrapping may not be exchangeable.

The first strap and the wrapping together form a head abutment portion extending between the two attachment points and configured to abut to the wearer's head when the headband is worn by the wearer. The head abutment portion may be configured to rest on the wearer's head while a portion of the carrier between the two attachment points is configured to hover over the head abutment portion and the wearer's head when the headband/headset is worn in its intended position. When the headband is in use, the head abutment portion acts as an adaptive surface that will accommodate to the curvature of the user's head as it can change shape and deflect towards the carrier when pushed by the head of the user. Having the head abutment portion formed from the wrapping and the first strap stretched over the carrier provides comfort for the user. A thickness of the head abutment portion may be in the range between half a centimetre and five centimetres when the headband is not worn by the user. This thickness is defined by the attachment points and the length of the first strap.

At least one of the first strap and the wrapping comprises a flexible and elastic material configured to stretch along the length of the carrier between the two attachment points, thereby providing the head abutment portion configured to adapt to the shape of the wearer's head. At least one of the first strap and the wrapping comprising a flexible and elastic material stretch along most of the length of the carrier. Both the first strap and wrapping may be flexible. The term flexible is to be interpreted as capable of bending without breaking. At least one of the strap and the wrapping needs to be stretchable so as to prevent undue amounts of force to be applied to a wearer's head. Typically, the wrapping which is arranged to be in direct contact with the head is a flexible and elastic sheet, while the first strap is flexible but non-elastic to thereby limit possible over-stretching of the wrapping. The first strap may also be elastic. However, if both the wrapping and the first strap are made of elastic materials, it may be desired to be made of materials having either a different elastic module and/or a different length in the area between the two attachment points.

In the present context, the term "elastic material" is to be interpreted as a material which can be stretched reversibly when it undergoes elastic strain. The material property that characterizes the elastic limit is the yield strength, or maximum stress that a material can withstand before it breaks or deforms permanently. The elastic material is configured to stretch along the length of the carrier and is configured to return to its original shape and/or size when force is released. The terms elastic and stretchable may be used interchangeably.

The head abutment portion can be seen as an airy cushion which will be in direct contact with the user's head when the headband is worn by the user, and which will accommodate any curvature of the user's head. The head abutment portion can accommodate any curvature of the head due to the flexibility of the wrapping and the carrier and due to the elasticity of at least one of the wrapping or the first strap. Due to the flexibility and elasticity of a material forming the headband abutment portion, the head abutment portion can be stretched and lengthened when the headband is placed on the user's head, exerting tension, and returns to its original shape and length when removed from the users head. Thus, the head abutment portion provides self-adjustments and a comfortable, secure fit for a range of head sizes and shapes. The combination of the wrapping and the first strap provides an increased head-headband contact length, resulting in a better pressure distribution and force balancing along the head which leads to better comfort.

Having the headband formed from the first strap attached to the carrier and supported by the wrapping, a one-piece headband which fits all head sizes is provided. Such a headband provides a simplified design compared to most headbands known in the art. A one-size headband is a user friendly design as it does not require the user to adapt the size of the headband to ensure a good fit. The headband according to the present invention is easy to manufacture as it requires only one or two different materials to be arranged on the carrier. Such a simple manufacturing saves manufacturing time as there is no need for further assembling steps in a product line. By careful design and choice of the carrier, the present invention provides a lightweight headband with a soft and flexible airy cushion, which thereby provides a great fit and comfort to potential users. Simultaneously, an elegant design, normally desired by a majority of users, is achieved. Additionally, the headband according to the present invention provides a uniform clamping force uniformly distributed over the user's ears and the top of the head achieved by the carrier and suspension design. The headband is therefore easy to use as the user does not have to adjust the tightness of the headband all the time. Furthermore, a precise geometry is achieved by arranging the first strap on the carrier and stretching the wrapping over the first strap and the carrier to thereby create the headband according to a predefined form. Finally, having a suspended first strap as a part of the headband provides a headband in which a pressure to the user's head is uniformly distributed along the contact between the user's head and the headband. Covering this suspension in the form of the first strap and wrapping the wrapping around the first strap ensures that nothing can be entangled in this suspension.

The headband of the present invention combines benefits of suspended headband-types and padded headband-types by attaching the first strap and the wrapping to the carrier. The headband with the head abutment portion provides a number of improvements compared to traditional bulky design normally resulting in a heavy headband. Compared to headbands with suspension, the headband of the present invention has an enclosed suspension, thereby preventing entanglement of any item between the carrier and the suspension. At the same time, the head abutment portion provides an adaptive surface that accommodates to the curvature of the head and thereby minimizes and equalizes pressure on the head along the contact length between the headband and the head.

The headband may have adjustable length. The length extension may be arranged in the area outside of the head abutment portion.

In some embodiments, the headband further comprises a second strap. The second strap may be arranged such that the first strap extends between the second strap and the carrier. In this embodiment, the second strap, together with the first strap and the wrapping, forms the head abutment portion. The second strap is above the wrapping, and the first strap is above the second strap and below the carrier, when the headband is worn by the user. The second strap may be attached to the carrier at the same attachment points where the first strap is connected to the carrier. The second strap may also be in the form of a thin band. The second strap may be shorter than the first strap. Typically, if the first strap is non-elastic, the second band will be elastic. In general, at least one of the first and second strap may be non-stretchable along its length and thereby have a fixed length to provide a limiter which blocks the wrapping, i.e. the head abutment portion to compress up to the carrier. This additional strap adds to the comfort and fit of the headband as it provides an additional degree of flexibility to the head abutment portion. The second strap may extend the contact length between the head abutment portion and the head when the headband is placed on the wearer's head.

In some embodiments, the first strap is formed from a non-stretchable material. In the present context, the non-stretchable material is to be interpreted as a material which exhibits none or a very limited stretching in a longitudinal direction. The longitudinal direction of the first strap is a direction defined by the two attachment points when the first strap is arranged on the carrier. When the first strap is made of a non-stretchable material, its function is to limit the stretching of the wrapping beyond a certain length, and thereby prevent a complete compression of the head abutment portion when the headband is worn by the user and possible contact of the head with the hard carrier. Also, it may be desired that the first strap, as well as the second strap and the wrapping are made of a soft, and not hard material to thereby provide a good comfort for the user. The first strap may be formed from a two-way stretchable fabric, a webbing band, a plastic foil, a moulded plastic part, rubber, or silicone.

In some embodiments, the first strap has a length which is shorter than the length of the carrier between the two attachment points. The first strap may be 5-20% shorter than the length of the carrier between the two attachment points, such as 10% shorter, such as 15% shorter. When the headband is placed on the user's head, the first strap will generally take a shape of the head. If the length of the first strap would be longer than the length of the carrier between the attachments points, the first strap will not serve a purpose of defining a thickness of the head abutment portion and/or limiting stretching of the wrapping, and possibly the second strap, if the second strap is also arranged. The length of the first strap, together with the length of the wrapping and possibly the second strap, define maximum compression of the head abutment portion. In other words, the head abutment portion may not compress further from the first strap, thereby preventing the head from getting into contact with the carrier.

In some embodiments, the second strap has a length which is shorter than the length of the first strap. In this embodiment, the shorter strap may be elastic and lengthwise stretchable, while the longer, first strap may be non-stretchable. The second strap may add to the softness of the head abutment portion, while the first strap may add to a force balancing, thereby resulting in a headband with an improved pressure distribution along the contact length between the head and the headband.

In some embodiments, the wrapping comprises a fabric. The wrapping is typically made from one type of a thin fabric sheet. The fabric used for the wrapping is preferably soft to provide comfort for the user as this part of the headband is in direct contact with the user's head. The fabric sheet may be flexible and stretchable. It can be arranged on the carrier such that it stretches lengthwise, i.e. mainly along the carrier's length and in a direction determined by the two attachment points.

In some embodiments, the second strap comprises a material selected from a list of fabric, rubber, and/or silicone. The second strap is typically flexible and stretchable, thereby further contributing to softness of the head abutment portion and thus the entire headband. In one example, the second strap can be an elastomer having highly elastic properties. In one example, the second strap can be a woven elastic fabric or rubber band having a length of 8-29 mm and a stretch capability of 30%-115%. In a further example, the second strap can comprise a spring, such as a spiral wound plastic spring or metal spring.

In some embodiments, the second strap comprises a spring. The second strap may comprise a non-stretchable material to which the spring is connected. The spring may be arranged at a first end of the non-stretchable material and/or at a second end of the non-stretchable material. The spring may be attached to the same attachment points where the first strap is attached to the carrier. The spring provides basic elasticity of the second strap or may provide additional elasticity in the case when the second strap comprises a stretchable material. Having the spring comprised in the second strap allows for use of a non-stretchable material. Springs can be attached to the carrier in an easy manner by means of, e.g., hooks. A hook may be arranged on the carrier.

In some embodiments, the head abutment portion is at least partly hollow and is configured to secure an electrical cable. The electrical cable may extend through an interior volume defined by the carrier and the wrapping, or through the interior volume of the head abutment portion. The cable may be attached to the carrier and the head abutment portion may then conceal the cable so it is not visible from the outside. The cable may electrically connect two earcups arranged on two ends of the headband, thereby forming a stereo headset. The electrical cable is typically configured for electrically connecting the at least one earcup of the headset with another earcup and/or with a microphone, and/or with other electrical components which may form part of the headband. When the headband carries only one earcup, the electrical cable may not be needed.

In some embodiments, the headband for a headset may further be configured to carry a headphone unit. The electrical cable may be attached to the carrier and configured for electrically connecting the headphone unit and the earcup. The headphone unit may comprise a microphone. The headphone unit may be arranged on the same side of the headband as the earcup. Otherwise it can be arranged on the other end of the headband and possibly together with another earcup. The cable may be attached to the carrier prior to the step of forming the head abutment portion. The cable may be attached to the carrier by gluing. Alternatively a pin or similar may be used for attaching the cable to the carrier, encapsulating the cable such that it is not visible. The cable may be arranged either on an inner side of the carrier, facing the head of the user, or it can be arranged on an outer side of the carrier, further away from the user's head, when the headband is worn by the user.

The present invention allows for a wider range of solutions to hide and/or protect the cable across the headband. This is especially a problem for traditional suspended headbands. Additionally, since the present solution eliminates the need for a support surface for headband foam padding, it also allows for a lighter and/or simpler structure for the cable guiding and protection compared to traditional padded headbands.

In some embodiments, the carrier and the head abutment portion contribute to a clamping force of the headband. The clamping force relates to a level of tightness of the headband. The clamping force also relates to the amount of pressure exerted by the headband against the user's head. The clamping force ensures a good overall fit and engagement of the headband and also a tight fit of the corresponding headset. The headband can mainly stretch in an x-direction, i.e. parallel with a line connecting the user's ears, e.g. an ear-to-ear (E2E) direction through the head, and the clamping force acts mainly in that that direction. The soft and flexible abutment portion can automatically fit a human head and can be deformed vertically to thereby provide good wearing comfort and a secure fit.

The carrier may provide a main clamping force while the head abutment portion contributes by fine tuning the main clamping force. The basic clamping force can be uniformly distributed along the carrier. The clamping force may also be uniformly distributed along the headband. The headband according to the present invention may fit all head sizes of adult users, mainly due to the uniformly distributed clamping force. It is. However, possible to adjust the ratchet length of the carrier and thereby change the length of the carrier. By adjusting the ratchet length, different opening distances of the headband can be achieved and thereby different clamping forces. The longer flexible lengths would fit wider heads, thereby achieving the appropriate clamping force level. In some embodiments, it is desired that only the carrier contributes to the clamping force. Typically, the more complex the head abutment portion design is and the more straps are attached to the carrier, the more the clamping force depends also on the head abutment portion in addition to the basic carrier clamping force. In solutions known in the art, a number of separate parts all contribute to the clamping force of a headband, resulting in a non-uniform clamping force. It is therefore beneficial to have only the carrier and the head abutment portion contributing to a clamping force of the headband.

In some embodiments, the carrier is formed from a rigid material. The metal carrier may be formed in a bended shape, such as U-like shaped. The carrier may be made of metal, hard plastics, and wood. Any metal can be used as a carrier, such as aluminium, copper, iron, tin, gold, lead, silver, titanium, zinc, etc. Additionally, metal alloys, such as steel, can also be used. The carrier may be a cold rolled stainless steel strip. The metal U-shaped carrier may be flexible. Having a metal carrier provides sufficient rigidity and robustness to the headband, and since the metal machining is well established, the carrier can be properly designed and shaped to exhibit a desired clamping force.

The carrier may also be cast from any hard plastics which can be bended and which can be flexible. The plastics carrier may be formed by injection moulding using one mould. Thermoplastics which are softened by heat and can be moulded may be used. Thermoplastic carrier may be shaped by injection moulding, blow moulding, or vacuum formation. Examples of thermoplastics are acrylic, polypropylene, polystyrene, polythene and PVC. The carrier may further be made of thermosets, such as melamine, bakelite, polyester, and epoxy resins which are formed by heat process.

The carrier may also be made of composites made by mixing materials together to get enhanced properties. Polyester resin may be mixed with glass fibre, epoxy resin may be mixed with carbon fibre to achieve a carrier which is stronger than steel but lighter.

The carrier may further be made of acrylic, PVC and uPVC, polythene, high-density polyethylene (HDPE) and a low-density grade polyethylene (LDPE) which is tough and flexible.

The carrier may be provided in a form of a bended strip. The carrier may have a thickness in the range between 0.2 mm and 5 mm. The carrier may have a width in the range between 1 cm and 10 cm. The carrier may have a total length in the range between 10 cm and 30 cm. The carrier may have a yield strength in the range between 500 Mpa and 1000 Mpa. The carrier may have a tensile strength in the range between 1000 Mpn and 1500 Mpn. The carrier may have a hardness in the range between 400 HV and 500 HV.

In some embodiments, the wrapping is wrapped around the first strap and the carrier. In this embodiment, the wrapping may be attached to the carrier at the same attachment points where the first strap is attached, thereby completely concealing the first strap and partly concealing the carrier. Alternatively, the wrapping may completely conceal the carrier and the first strap, and optionally the second or any other strap, such that only the wrapping is visible on the final headband. In this scenario, the wrapping may be attached to the ends of the carrier. In another embodiment, the wrapping material may be wrapped around a portion of the carrier, and in particular the portion which is configured to hover over the top of the user's head and which extends further from the first strap attachment points. It is advantageous to have the wrapping wrapped around the first strap and the carrier, as such formation improves aesthetics and wearing comfort.

Alternatively, only a bottom side of the carrier, i.e. the side facing the head, when the headband is in its intended position on the user's head, may be covered by the wrapping material. In all these embodiments, the head abutment portion may be created, i.e. there may be a portion of the headband material around the midpoint which appears thicker than the rest. This portion would be positioned around the top of the user's head when the headband is in use.

In a preferred embodiment, the carrier is made of a metal, the first strap is made of a non-stretchable tape and the wrapping is made of a leatherette. In other embodiments, the carrier may be made of a hard plastic, such as PA and the wrapping may be made of a textile material.

In some embodiments, any of the first and second strap are attached to the carrier via the wrapping. In some embodiments, the first strap may be attached to the wrapping and then the first strap and the wrapping may together be attached to the carrier at the two attachment points. In another embodiments, the second strap may be attached to the wrapping, and then the second strap and the wrapping may together be attached to the carrier. This attachment may be at the two attachment points or at any other place of the carrier. In some embodiments, the first strap and the second strap may both be attached to the wrapping, and then all together be attached to the carrier. When the first and/or second strap is/are attached to the wrapping and then attached to the carrier a better control of elasticity and stretchability of the head abutment portion can be achieved, resulting in better comfort for the wearer.

In a second aspect, disclosed is a headphone comprising a headband according to the first aspect and at least one earcup arranged at an end of the headband. It should be understood that all the embodiments, benefits and advantages described in connection with the first aspect are equally relevant for this second aspect.

The present invention relates to different aspects including the headband described above and in the following, and the headphone, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
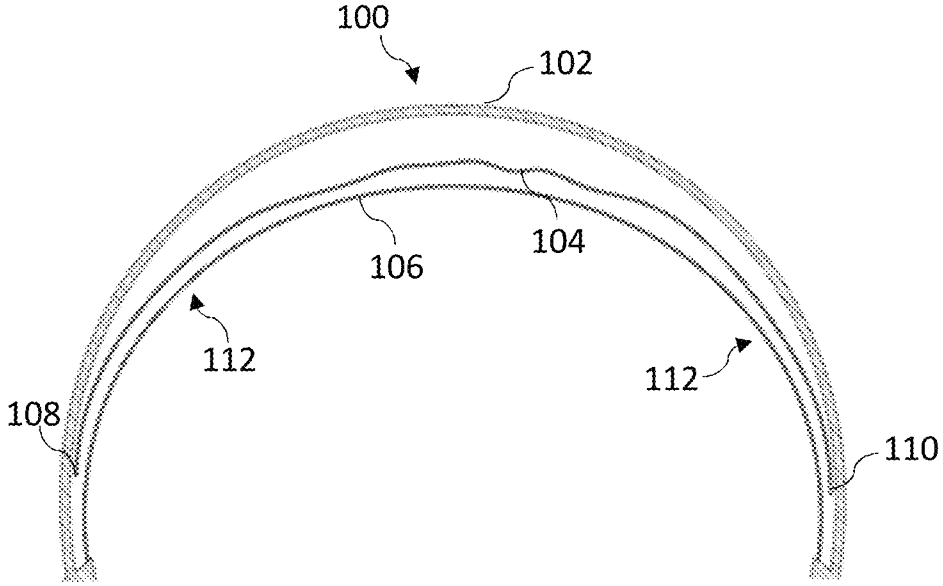
FIG. 1 schematically illustrates an exemplary embodiment of a headband for a headset according to the present invention, FIG. 2 schematically illustrates the headband of FIG. 1 with two earcups arranged thereon, FIG. 3 schematically illustrates another exemplary embodiment of a headband for a headset according to the present invention, FIG. 4 schematically illustrates yet another exemplary embodiment of a headband for a headset according to the present invention, FIG. 5A and 5B schematically illustrate headphone having a headband according to an embodiment of the present invention.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 illustrates an exemplary embodiment of a headband 100 for a headset according to the present invention. The headband 100 for a headset is configured to carry at least one earcup of the headset. The headband comprises a carrier 102, a first strap 104 and a wrapping 106. The carrier 102 is being curved to conform to a wearer's head. The first strap 104 is attached to the carrier 102 at two attachment points 108 and 110. The wrapping 106 is being attached to the carrier 102 and arranged to conceal the first strap 104. The first strap 104 and the wrapping 106 together form a head abutment portion 112 extending between the two attachment points and configured to abut to the wearer's head when the headband is worn by the wearer. At least one of the first strap 104 and the wrapping 106 comprises a flexible and elastic material configured to stretch along the length of the carrier 102 between the two attachment points 108 and 110, thereby providing the head abutment portion 112 configured to adapt to the shape of the wearer's head.

The embodiment shown in FIG. 1 shows the headband 100 that may comprise the first strap 104 formed from a non-stretchable material. The non-stretchable material may still be flexible so it can bend and take another shape than the one shown in FIG. 1. In this way the first strap may loosely hang on the carrier and may take any shape. The wrapping 106 may then be made from a stretchable material so that, when the user wears the headband, the wrapping 106 will stretch to a limit determined by the length of the first strap 104.

The first strap 104 may have a total length which is shorter than the length of the carrier 102 between the two attachment points 108 and 110. In this way, the wrapping cannot stretch such that it touches the carrier. Thus, the top of the wearer's head cannot be exposed to the carrier 102 which is normally made of a hard material.

The carrier 102 may be formed from a rigid material formed in a U-shape. The wrapping 106 may comprise a fabric. The first strap 104 may be a non-stretchable plastic band. The carrier 102 and the head abutment portion 112 may contribute to a clamping force of the headband 100.

Figure 2:
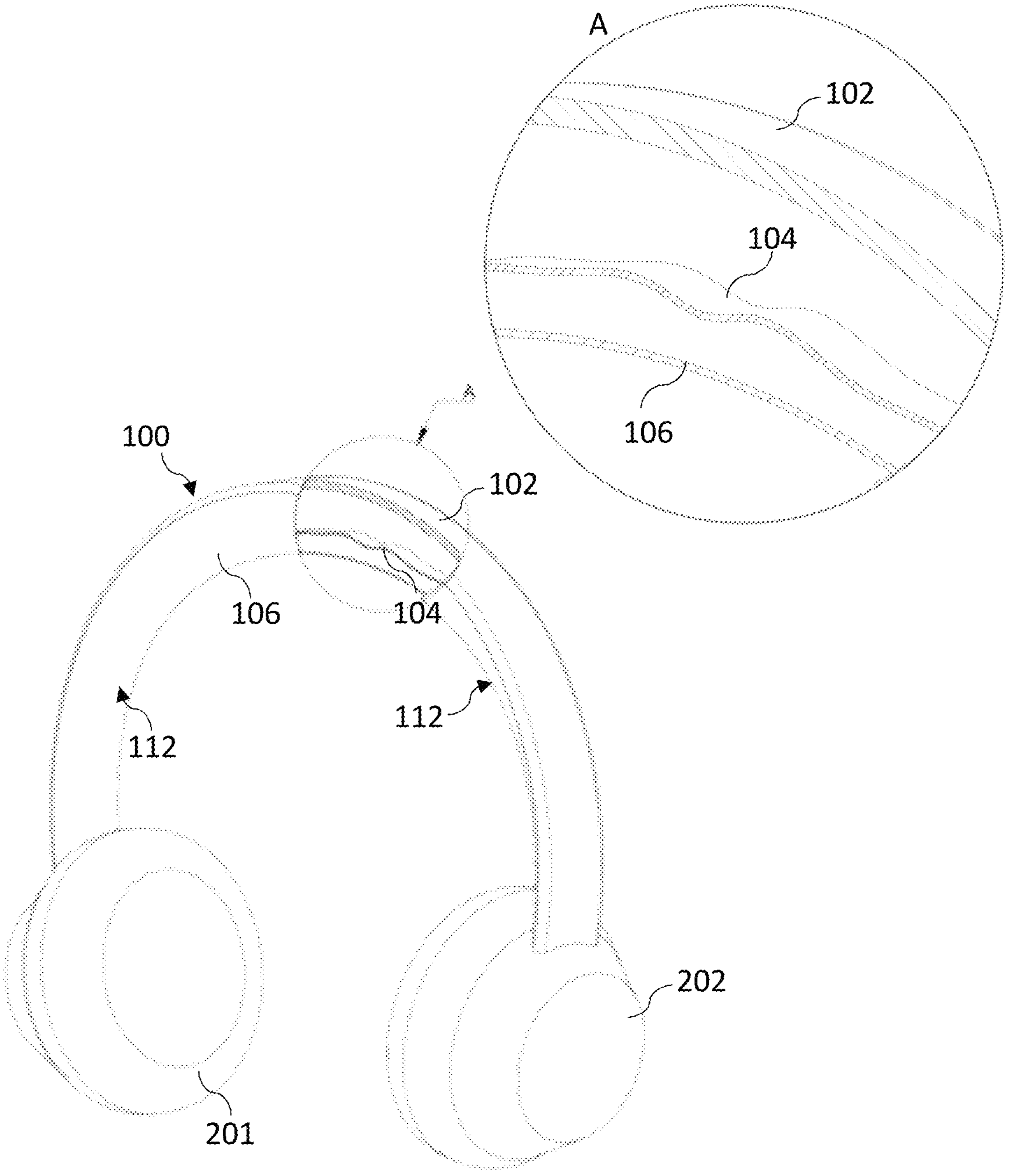

FIG. 2 schematically illustrates the headband 100 of FIG. 1 with two earcups 201 and 202 arranged thereon. The earcups 201, 202 are arranged at the ends of the headband 100. The headband 100 is shown in another perspective showing that the wrapping 106 conceals the first strap 104 and showing a profile of the head abutment portion 112. The wrapping 106 may be wrapped around the first strap 104 and the carrier 102.

The insert A shows the carrier 102, first strap 104, and wrapping 106. The head abutment portion 112 may at least partly be hollow and may be configured to secure an electrical cable (not shown). The electrical cable may be configured for electrically connecting the earcups 201 and 202.

Figure 3:
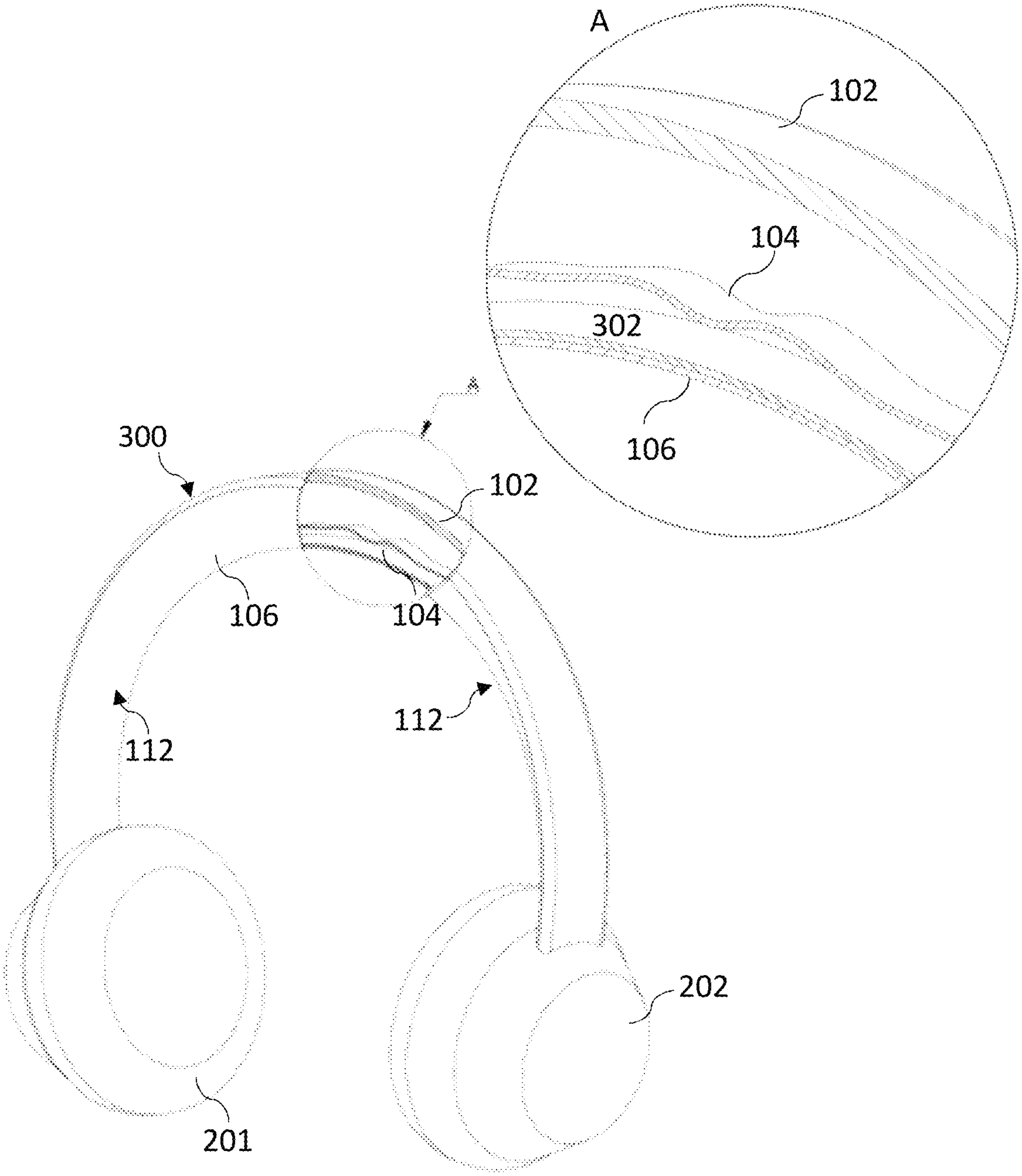

FIG. 3 schematically illustrates another exemplary embodiment of a headband 300 for a headset according to the present invention. The earcups 201 and 202 are arranged thereon. As shown in the insert A, the headband 300 comprises a carrier 102, first strap 104, wrapping 106, and additionally comprises a second strap 302. In the embodiment shown on FIG. 3, the second strap 302 is arranged between the wrapping 106 and the first strap 104. The second strap 302 may have a length which is shorter than the length of the first strap 104. The second strap 302 may be attached to the carrier 102 at the same attachment points where the first strap 104 is connected to the carrier 102. The second strap 302 may also be in the form of a thin band. The second strap 302 may comprise a material selected from a list of fabric, rubber, and/or silicone. The second strap 302 extends the contact length between the head abutment portion 112 and the wearer's head when the headband is placed on the wearer's head. The second strap 302 may add to the softness of the head abutment portion 112, while the first strap 104 may add to a force balancing, thereby resulting in a headband with an improved pressure distribution along the contact length between the head and the headband 300.

Figure 4:
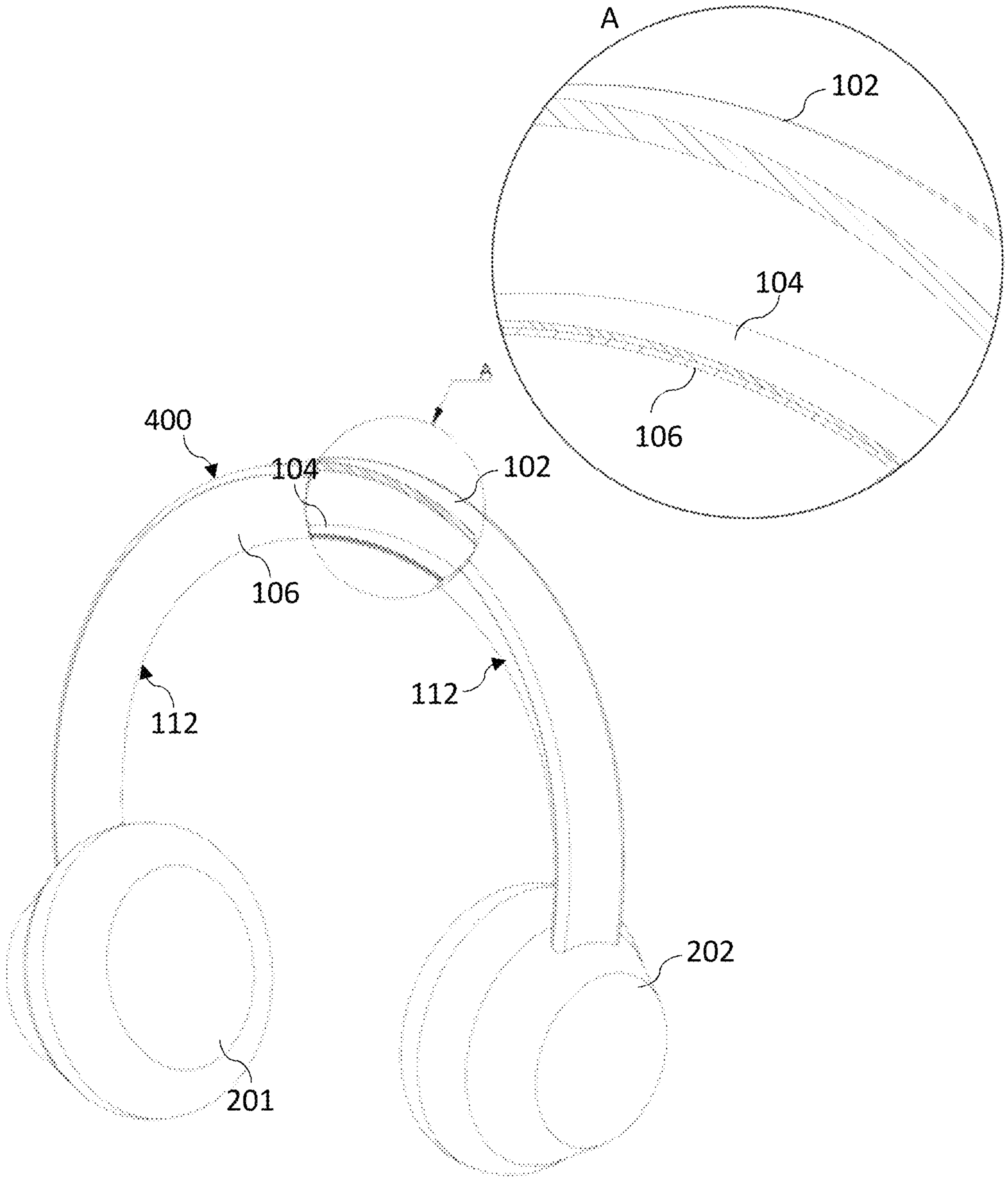

FIG. 4 schematically illustrates yet another exemplary embodiment of a headband 400 for a headset according to the present invention. The earcups 201 and 202 are arranged thereon. As shown in the insert A, the headband 400 comprises a carrier 102, first strap 104, and wrapping. In the embodiment shown on FIG. 4, the first strap 104 is arranged close to the wrapping 106. In this embodiment, the first strap may be made of a stretchable material while the wrapping 106 may be non-stretchable. Alternatively, the wrapping may also be made of a stretchable material. The first strap 104 may comprise a material selected from a list of fabric, rubber, and/or silicone.

Figure 5A:
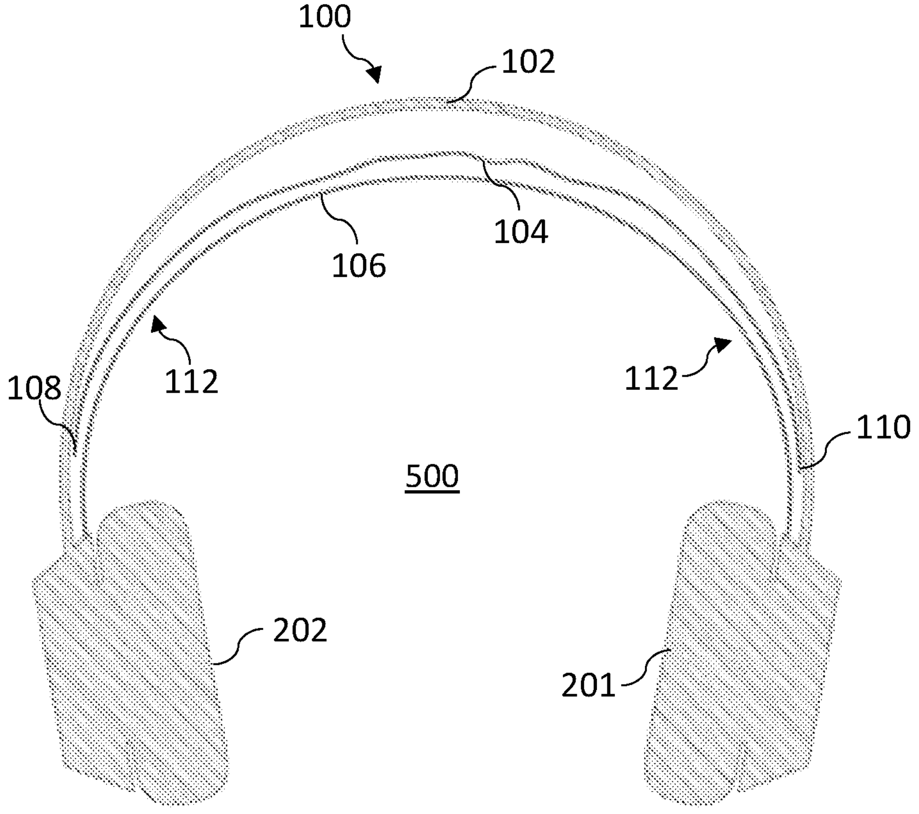
Figure 5B:
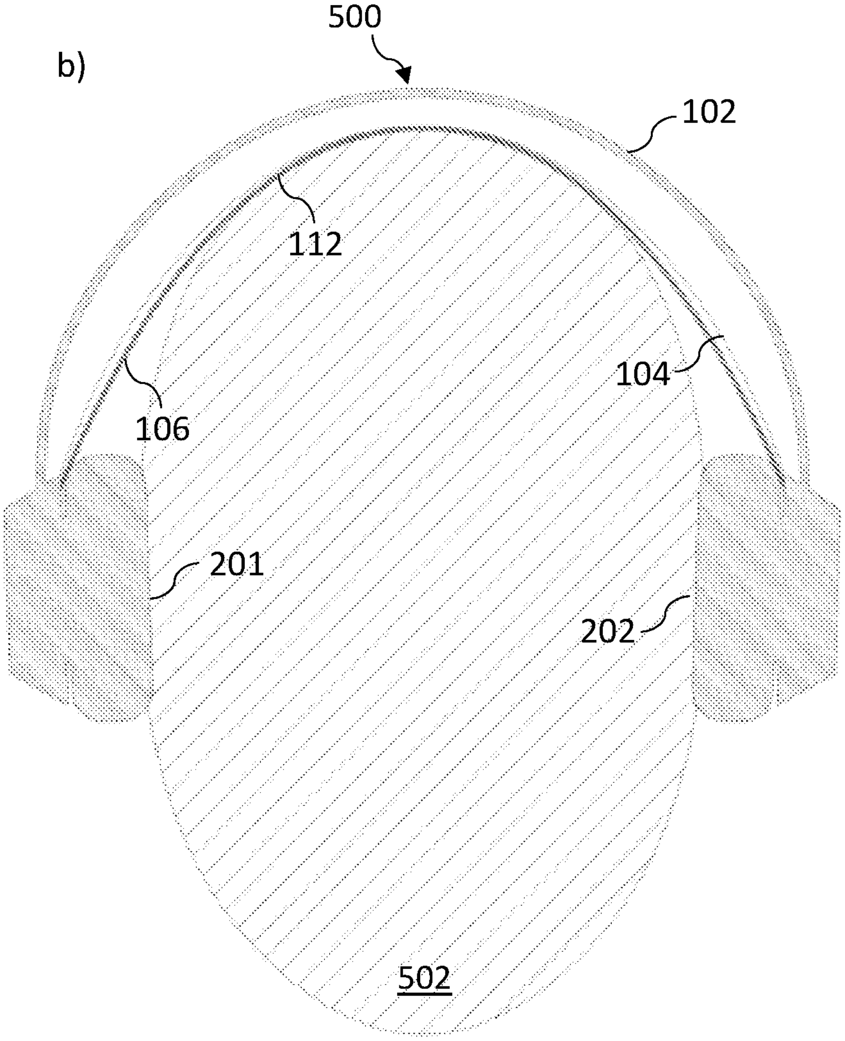

FIG. 5A and FIG. 5B schematically illustrate headphone 500 having a headband 100 according to an embodiment of the present invention. FIG. 5*a*) illustrates the headphones 500 when not in use, while FIG. 5*b*) illustrated the headphones 500 arranged on the wearer's head 502. The headband 100 may be any of the headbands 100, 300, and 400 illustrated on FIGS. 1-4. When the headphones 500 are not in use, the first strap 104 may be loose. As soon as the headphones 500 are arranged on the wearer's head 502, both the wrapping and the first strap may flex and tighten such that the head abutment potion 112 abuts the head while preventing head contact with the carrier 102.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

100 headband
102 carrier
104 first strap
106 wrapping
108 attachment point
110 attachment point
112 head abutment portion
201 earcup
202 earcup
300 headband
302 second strap
400 headband
500 headphones
502 head

The invention claimed is:

1. A headband for a headset, the headband being configured to carry at least one earcup of the headset, the headband comprising:

a carrier;

a first strap;

a second strap arranged so that the first strap extends between the second strap and the carrier; and a wrapping, wherein the carrier is being curved to conform to a wearer's head, wherein the first strap is attached to the carrier at two attachment points, wherein the second strap is shorter than the first strap, wherein the first strap is shorter than the carrier between the two attachment points, wherein the wrapping is being attached to the carrier and arranged to conceal the first strap, wherein the first strap and the wrapping together form a head abutment portion extending between the two attachment points and configured to abut to the wearer's head when the headband is worn by the wearer, and wherein at least one of the first strap and the wrapping comprises a flexible and elastic material configured to stretch along the length of the carrier between the two attachment points, thereby providing the head abutment portion configured to adapt to the shape of the wearer's head.

2. The headband for the headset according to claim 1, wherein the first strap is formed from a non-stretchable material.

3. The headband for the headset according to claim 1, wherein the wrapping comprises a fabric.

4. The headband for the headset according to claim 1, wherein the second strap comprises a material selected from a list of fabric, rubber, and/or silicone.

5. The headband for the headset according to claim 1, wherein the second strap comprises a spring.

6. The headband for the headset according to claim 1, wherein the head abutment portion is at least partly hollow.

7. The headband for the headset according to claim 1, wherein the carrier and the head abutment portion contribute to a clamping force of the headband.

8. The headband for the headset according to claim 1, wherein the carrier is formed from a rigid material formed in a U-shape.

9. The headband for the headset according to claim 1, wherein the wrapping is wrapped around the first strap and the carrier.

10. The headband for the headset according to claim 1, wherein any of the first and second strap are attached to the carrier via the wrapping.

11. A headphone for the headband according to claim 1 and at least one earcup arranged at an end of the headband.

* * * * *